(12) United States Patent
Yilbas et al.

(10) Patent No.: US 8,190,402 B2
(45) Date of Patent: May 29, 2012

(54) METHOD OF MODELING FLEXURAL CHARACTERISTICS OF A BAR SUBJECTED TO LOCAL HEATING

(75) Inventors: Bekir Sami Yilbas, Dhahran (SA); Iyad Al-Zaharnah, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 408 days.

(21) Appl. No.: 12/453,242

(22) Filed: May 4, 2009

(65) Prior Publication Data

US 2010/0280800 A1    Nov. 4, 2010

(51) Int. Cl.
*G06F 17/50*    (2006.01)
(52) U.S. Cl. .................. 703/1; 703/6; 703/7; 700/98
(58) Field of Classification Search ............. 703/1, 6, 703/7; 700/98
See application file for complete search history.

(56) References Cited

U.S. PATENT DOCUMENTS

| | | | |
|---|---|---|---|
| 2001/0008469 A1 | 7/2001 | Bar et al. | |
| 2006/0109314 A1 | 5/2006 | Cabal et al. | |
| 2007/0258168 A1 | 11/2007 | Lee et al. | |
| 2007/0291419 A1 | 12/2007 | Lee et al. | |
| 2007/0296539 A1 | 12/2007 | Cabal et al. | |
| 2008/0026493 A1 | 1/2008 | Shakouri et al. | |
| 2008/0126038 A1 | 5/2008 | Alvarez et al. | |

FOREIGN PATENT DOCUMENTS

| | | |
|---|---|---|
| CH | 101221416 (A) | 7/2008 |
| CH | 101279318 (A) | 10/2008 |
| JP | 2001269776 (A) | 10/2001 |
| JP | 2006000879 (A) | 1/2006 |
| JP | 2007210528 (A) | 8/2007 |

OTHER PUBLICATIONS

Pedro Ribeiro et al., "The effect of temperature on the large amplitude vibrations of curved beams," 2005, Journal of Sound and Vibration, vol. 285, pp. 1093-1107.*
Anthony F. Mills, "Heat and Mass Transfer," 1995, Richard D. Irwin Inc., pp. 123-222.*
Leonard Meirovitch, "Fundamentals of Vibrations," 2001, McGraw-Hill, pp. 87-91, 383-403.*
William T. Thomson, "Theory of Vibration with Applications," fifth edition, 1998, Prentice-Hall, pp. 30, 271-274.*
G.N. Praveen et al., "Nonlinear transient thermoelastic analysis of functionally graded ceramic-metal plates," 1998, International Journal of Solids and Structures, vol. 35, No. 33, pp. 4457-4476.*
J. Yang et al., "Vibration characteristics and transient response of shear-deformable functionally graded plates in thermal environments," 2002, Journal of Sound and Vibration, vol. 255, No. 3, pp. 579-602.*
Young-Wann Kim, "Temperature dependent vibration analysis of functionally graded plates," 2005, Journal of Sound and Vibration, vol. 284, pp. 531-549.*

(Continued)

*Primary Examiner* — Kandasamy Thangavelu
*Assistant Examiner* — Russ Guill
(74) *Attorney, Agent, or Firm* — Richard C. Litman

(57) ABSTRACT

The method of modeling flexural characteristics of a bar subjected to local heating utilizes thermal diffusion equations and the finite element method to model vibrational frequency and amplitude variation in a substrate material subjected to local heating. Both heated and non-heated cases are considered.

3 Claims, 16 Drawing Sheets

OTHER PUBLICATIONS

N. Sundararajan et al., "Nonlinear free flexural vibrations of functionally graded rectangular and skew plates under thermal environments," 2005, Finite Elements in Analysis and design, vol. 42, pp. 152-168.*

Xiao-Lin Huang et al. "Nonlinear vibration and dynamic response of functionally graded plates in thermal environments," 2004, International Journal of Solids and Structures, vol. 41, pp. 2403-2427.*

A.A. Adeniji-Fashola et al., "Thermal gradient effects on the vibration of prestressed rectangular plates," 1988, Acta Mechanica, vol. 74, pp. 235-248.*

D.J. Mead, "Vibration and buckling of flat free-free plates under non-uniform in-plane thermal stresses," 2003, Journal of Sound and Vibration, vol. 260, pp. 141-165.*

I.T. Alzaharnah and B.S. Yilbas, "Investigation into flexural characteristics of a bar subjected to local heating: the effect of heat source location", Proc. IMechE, vol. 222, Part B: J. Engineering Manufacture. Nov. 2008.

* cited by examiner

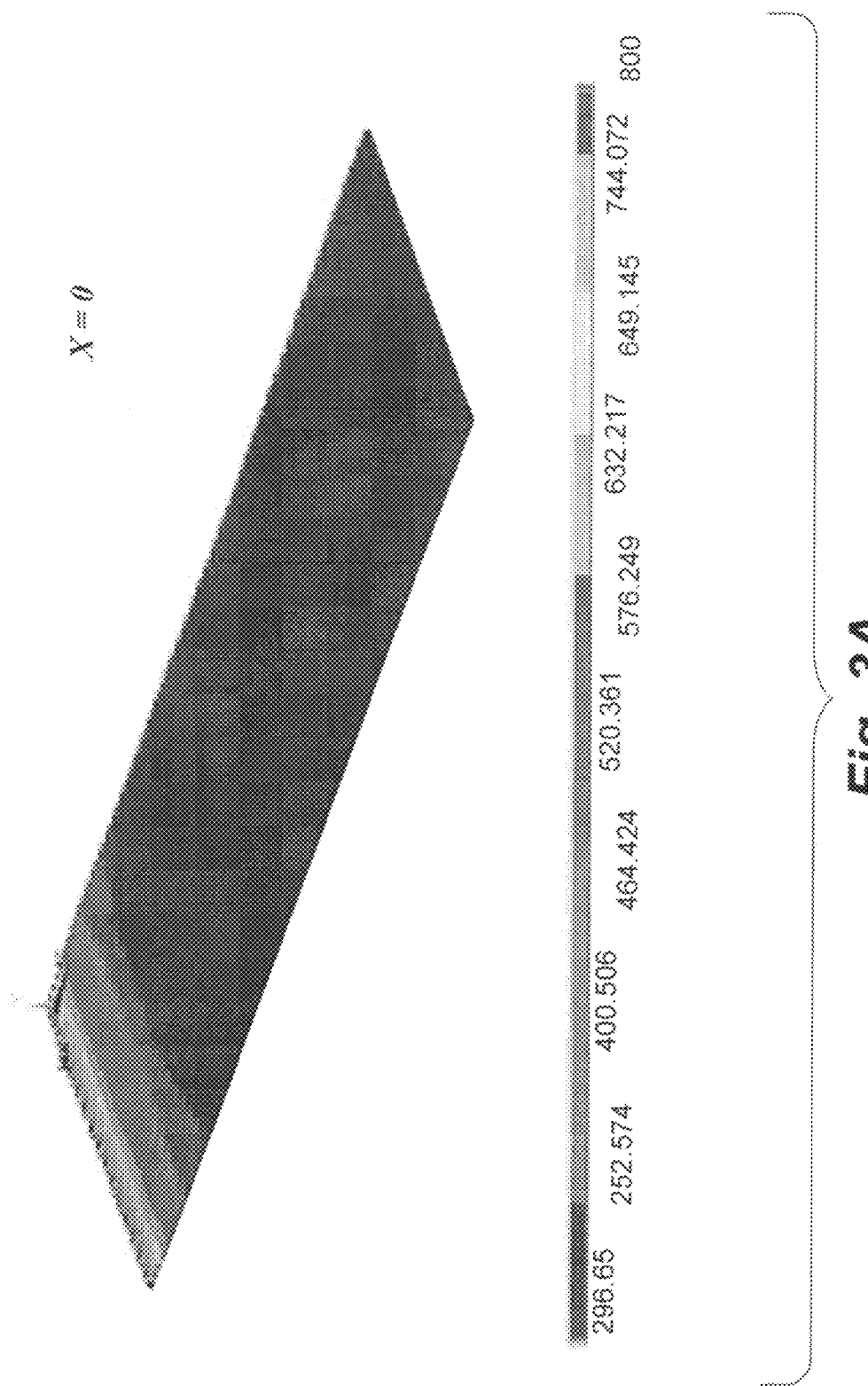

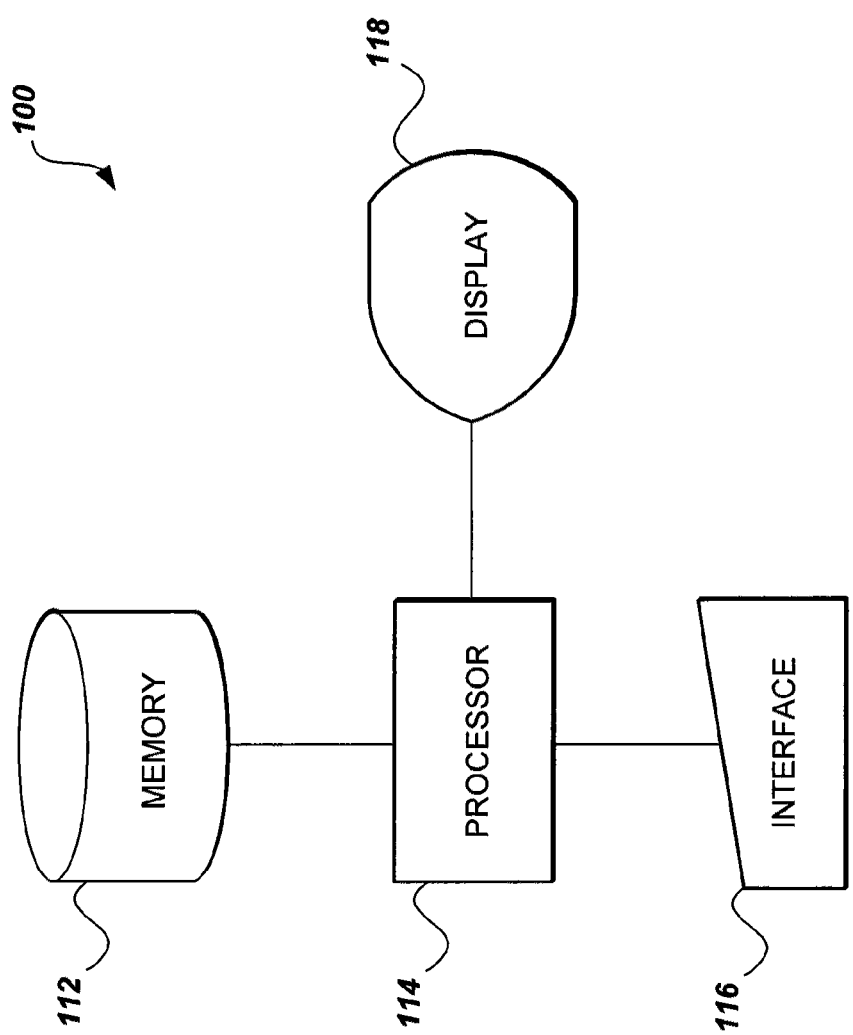

METHOD OF MODELING FLEXURAL CHARACTERISTICS OF A BAR SUBJECTED TO LOCAL HEATING

BACKGROUND OF THE INVENTION

1. Field of the Invention

The present invention relates to numerical modeling and simulation methods. Particularly, the method of modeling flexural characteristics of a bar subjected to local heating utilizes thermal diffusion equations and the finite element method to model vibrational frequency and amplitude variation in a substrate material subjected to local heating.

2. Description of the Related Art

Various tests have been used to characterize the mechanical properties of material samples, particularly of polymer plastics and elastomer or rubbery materials. In one short-term category are impact tests, such as Izod impact, and Durometer testing. A thin piece of material is placed on a hard surface and impacted by a hard object at varying kinetic energies until permanent deformation or rupture is observed. Other hardness tests array materials according to which material will scratch which softer material, for example, diamond scratching sapphire, sapphire scratching quartz, etc. Creep properties are less often determined, since the testing is time-consuming. Samples may be subjected to a constant stress for an extended period at a controlled temperature while strain is measured, resulting in a graph of a time-dependent modulus of elasticity, the "creep modulus," representing the ratio of stress to strain plotted as a function of time.

Since strain increases over time at constant stress due to material creep, the creep modulus is a decreasing function of time. Families of creep modulus graphs are typically plotted for selected fixed stresses and fixed temperatures. Creep modulus graphs commonly extend from a first measurement at one hour (of sustained stress) to 1000 hours or more. Each graph in a family of creep modulus graphs requires that a separate material sample be maintained at a separate temperature and stress in a test apparatus for the full duration, for example, 1000 hours, indicating the time-consuming and expensive nature of the testing. For testing of dynamic stress/strain relationships on an intermediate time scale between very short-term impact and very long-term creep, machines are sometimes employed that impose programmable progressively-increasing or cyclically-changing strain over time while measuring stress, typically over a time scale of seconds to minutes. Controlled strain is commonly applied to soft materials, especially elastomers, while stress is measured. On harder materials, where it can be difficult to control strain, stress is varied while strain is measured. In a common testing protocol, stress is increased monotonically while strain is measured. When a specified strain threshold is reached, typically where the material deviates from more or less reversible elastic behavior to plastic strain and permanent deformation, this threshold defines the yield stress. Complete failure or rupture of the sample defines ultimate stress, sometimes called tensile stress. In metals, material samples may be subjected to cyclic stress over millions of cycles at various stress levels, defining a fatigue stress threshold below which samples cease to exhibit progressive weakening or embrittlement leading to failure.

In material testing, variations of elastic properties of materials beyond those described above are often desired, such as the testing of induced vibrational frequency and amplitude of a cantilevered bar. Variations of these elastic properties due to heating is of particular interest. The traditional tests described above, usually not involving programmable test equipment, suffer from several limitations. The longer term tests involving sustained stresses at controlled temperature tie up equipment for long periods of time. Where process control is involved, the value of test data declines rapidly with the time it takes to obtain the data. While impact and scratch hardness types of tests provide quick results, tests for creep properties are far too slow to provide information for tuning real-time process parameters that produce the material.

The short term tests measure only a failure threshold under a fixed set of conditions, providing little insight into other material properties. Combining test results can reveal material properties over wide-ranging conditions, but the results do not generate a predictive analytic model that could describe material response to a set of conditions outside the specific conditions of the test results. It would be desirable that test results could be used to define a predictive model of material properties, applicable to describing dynamic response of individual cells in a Finite Element Analysis. Families of measured curves obtained under dynamic conditions and at varying temperatures provide a wealth of data that have not been reducible to a predictive model, even when the data span the conditions of concern for actual use of the material. Better modeling, striking a compromise between true and accurate description on the one hand, and generality of application on the other hand, has the potential to lead to better testing, better quality control in manufacture and receiving, and better insight into how the materials behave and might be improved.

Thus, a method of modeling flexural characteristics of a bar subjected to local heating solving the aforementioned problems is desired.

SUMMARY OF THE INVENTION

The method of modeling flexural characteristics of a bar subjected to local heating utilizes thermal diffusion equations and the finite element method to model vibrational frequency and amplitude variation in a substrate material subjected to local heating. Both heated and non-heated cases are considered.

The method includes the steps of:

a) establishing a set of variables x, y, z, t, T, ρ, $c_p$, and k, where the variables x, y and z represent Cartesian coordinates of a heated bar, the heated bar being elongated along the x-axis, T represents temperature, ρ represents a density of the heated bar, t represents time, $c_p$ represents a specific heat capacity of the heated bar, and k represents a thermal conductivity of the heated bar;

b) calculating transient thermal diffusion through the heated bar as $$\rho c_p \frac{\partial T}{\partial t} = k\left(\frac{\partial^2 T}{\partial x^2} + \frac{\partial^2 T}{\partial y^2} + \frac{\partial^2 T}{\partial z^2}\right);$$

c) establishing boundary conditions for the calculation of transient thermal diffusion through the heated bar;

d) calculating a fundamental frequency of vibration of the heated bar using a non-heated model such that $$z = A\cosh\left[\left(\frac{m\omega^2}{EI}\right)^{\frac{1}{4}} x\right] +$$

$$B \sinh\left[\left(\frac{m\omega^2}{EI}\right)^{\frac{1}{4}} x\right] + C\cos\left[\left(\frac{m\omega^2}{EI}\right)^{\frac{1}{4}} x\right] + D\sin\left[\left(\frac{m\omega^2}{EI}\right)^{\frac{1}{4}} x\right],$$

where A, B, C and D are integration constants, m represents a mass of the heated bar, E represents an elastic modulus of the heated bar, I represents a moment of inertia of the bar, and w represents the fundamental frequency of vibration;

e) establishing vibrational boundary conditions for the calculation of the fundamental frequency of vibration;

f) calculating a damped natural frequency of vibration of the heated bar as $\omega_d = \omega\sqrt{1-\xi^2}$, where $\xi$ represents a damping constant of the heated bar;

g) calculating a temperature-dependent frequency and a temperature-dependent amplitude of vibration for the heated bar based upon the damped natural frequency of vibration; and h) displaying numerical results of the calculated temperature-dependent frequency and temperature-dependent amplitude of vibration for the heated bar.

The step of establishing boundary conditions for the calculation of transient thermal diffusion includes setting the temperature T at a selected cross-sectional slice of the heated bar having a constant x value to a melting temperature of the heated bar $T_m$, and further establishing convective boundaries at upper and lower surfaces of the heated bar such that at the upper and lower surfaces, $[q]^T[\eta] = h_f[T_S - T_B]$, where $[\eta]$ represents a unit outward vector normal to the upper and lower surfaces, $h_f$ represents a heat transfer coefficient, $T_s$ represents a surface temperature of the upper and lower surfaces, and $T_B$ represents a bulk temperature of fluid adjacent the upper and lower surfaces. The step of establishing vibrational boundary conditions preferably includes setting $$y\big|_{x=0} = 0 \text{ and } \frac{dy(x)}{dx}\bigg|_{x=0} = 0$$

at a fixed end of the heated bar, and setting $$\frac{d^2 y(x)}{dx^2}\bigg|_{x=l} = 0 \text{ and}$$
$$\frac{d^3 y(x)}{dx^3}\bigg|_{x=l} = 0$$

and at a free end of the heated bar.

These and other features of the present invention will become readily apparent upon further review of the following specification and drawings.

BRIEF DESCRIPTION OF THE DRAWINGS

FIGS. 3A, 3B, 3C and 3D illustrate temperature contours of the heated bar at varying heating locations.

FIG. 10 diagrammatically illustrates a system for implementing the method of modeling flexural characteristics of a bar subjected to local heating according to the present invention.

Similar reference characters denote corresponding features consistently throughout the attached drawings.

DETAILED DESCRIPTION OF THE PREFERRED EMBODIMENTS

The present invention relates to a method for modeling the flexural characteristics of a cantilevered uniform bar subjected to heating. The flexural characteristics being modeled include the period of oscillation and the maximum amplitude of motion in the heated bar due to an external driving force. The modeled heating resembles conditions created immediately after an electrical resistance welding process, with a variable heating or welding location being utilized.

The method of modeling allows for a simulated correlation between the natural characteristics of motion of the bar with the applied heating resulting from different welding scenarios. Study of such a simulation allows for the improvement in the quality of welded products, which tend to be affected by the generated thermal distortion and the residual stresses associated with welding processes. These factors may contribute to fatigue, stress-corrosion cracking, and buckling deformation. Investigating the vibrational characteristics of welded structures, and relating the resulting temperature fields with the flexural characteristics thereof, is of particular interest in the study of the effects of welding parameters.

Upon application of an external mechanical force to the bar, the flexural wave generated in the substrate material is modified due to irregularities within the substrate material and, further, the temperature-dependent mechanical properties of the material. Additionally, the local heating in the substrate material further alters the mechanical properties as well as the resulting flexural characteristics when the substrate material is subjected to the flexural load. Measurement or prediction of the flexural characteristics of the substrate material enables prediction of the heat source location in the substrate material. Thus, investigation into the flexural characteristics of locally heated and unheated plates is desirable in order to assess the changes in the flexural characteristics, such as amplitude and the frequency of the resulting wave, due to heating and non-heating situations.

Figure 1:
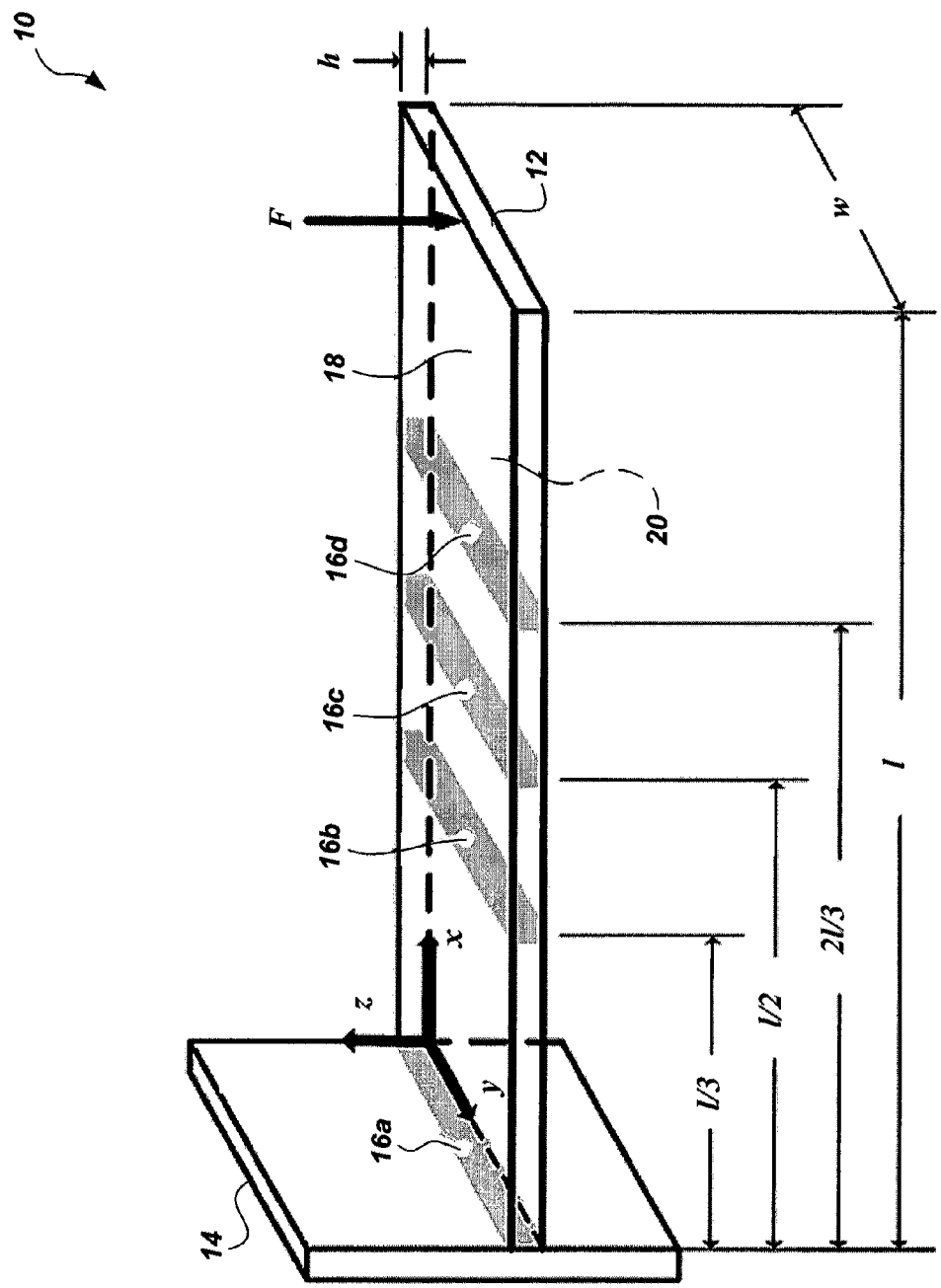
FIG. 1 is a diagrammatic view of a system for heating a cantilevered bar.

FIG. 1 illustrates the mechanical system being simulated by the present method. As shown, system 10 includes a bar or substrate layer 12 supported at one end thereof by a support 14. Preferably, substrate 12 extends along a substantially horizontal plane, as shown, with support 14 being oriented along a substantially vertical plane, and with an impulsive force F being delivered to substrate 12 at the opposite end thereof, as shown. The bar or substrate is preferably substantially rectangular in cross-sectional contour, having a width w, a length l, and thickness h oriented in the cantilever arrangement shown in FIG. 1. The present method models the effects of a local heat source (resembling those found immediately after an electric resistance welding process) on the wave or flexural characteristics in the substrate when an impulsive load F is applied at the end of the bar 12 opposite support 14.

The heat source is introduced along the width of the bar 12 and the location of the heat source is modeled at variable locations along the length of the bar 12. In FIG. 1, with the bar 12 being oriented using Cartesian x, y and z-axes, as shown, with length being measured along the x axis, a length of x=0 corresponds to the location (shown as a cross-sectional slice in bar 12) where bar 12 is attached to support 14. The length of x=0 is labeled as 16a in FIG. 1. The second point of interest, chosen for exemplary and illustrative purposes only, point 16b, corresponds to a distance of x=l/3. The further points being modeled in this example, points 16c and 16d, correspond to lengths of x=l/2 and x=2l/3, respectively. In FIG. 1, the upper and lower surfaces (through which heat is lost via convection, primarily) are labeled 18 and 20, respectively. Since the elastic modulus of the bar 12 is temperature dependent, the change of the location of the heat source modifies the wave or flexural characteristics thereof. This allows for the modeling of the change of heat source location and the corresponding variation of the magnitude and frequency of the flexural wave generated in bar 12 by impulsive force F. At each modeled welding point (along the cross-sectional slice, extending along the y and z-axes for a constant x), the temperature $T_m$ is considered to be constant along the entire slice.

The transient diffusion equation based on the Fourier heating model can be written in Cartesian coordinates as:

$$\rho c_p \frac{\partial T}{\partial t} = k\left(\frac{\partial^2 T}{\partial x^2} + \frac{\partial^2 T}{\partial y^2} + \frac{\partial^2 T}{\partial z^2}\right) \quad (1)$$

where $\rho$ is the density of the substrate material, $c_p$ is the specific heat capacity of the substrate material, and k is the thermal conductivity of the substrate material. T represents the temperature and t represents time. The thermal boundary conditions of a flat solid, such as substrate 12, are given by:

1. A constant temperature heat source is assumed at one of the points 16a, 16b, 16c or 16d, as shown in FIG. 1; i.e., $T=T_m$ at $0 \leq y \leq h$ and at $0 \leq z \leq w$, where $T_m$ is the melting temperature of the flat substrate material; and 2. at the free surfaces 18, 20 (in the x-y plane at z=0 and z=h), a convective boundary is assumed, therefore, the corresponding boundary condition is given by $[q]^T[\eta]=h_f[T_s-T_B]$ at z=0 and at z=h, where $[\eta]$ is the unit outward normal vector, $h_f$ is the heat transfer coefficient, and $T_s$ and $T_B$ are the surface temperature and bulk temperature of the adjacent fluid, respectively.

Initially the substrate material 12 is assumed to be at a reference temperature $T_0$, thus the initial condition becomes $T=T_0$ at t=0. Exemplary properties of the uniform bar material used are given in Table 1 for purposes of exemplary calculation.

TABLE 1

| | |
|---|---|
| Thermal conductivity, k (W/m K) | 53 |
| Specific heat $c_p$ (J/kg K) | 520 |
| Poisson's ratio, ν | 0.29 |
| Thermal expansion coefficient, α (1/K) | $1.5 \times 10^{-5}$ |

TABLE 1-continued

| | |
|---|---|
| Density, ρ (kg/m³) | 7880 |
| Damping coefficient, ξ | 0.015 |

The numerical modeling is performed using a finite element analysis. In the finite element domain, the uniform bar is divided into SOLID98 ANSYS elements. As is well-known in the field of finite element analysis, SOLID98 is a 10-node tetrahedral version of the common 8-node SOLID5 element. The element has a quadratic displacement behavior and is well suited to model irregular meshes (as are typically utilized by CAD/CAM systems). The element is defined by ten nodes with up to six degrees of freedom at each node. Each of the ten nodes has three structural translations and one thermal degree of freedom at each node (i.e., temperature T).

In order to compare numerical predictions of the inventive method with an analytical solution, a simple non-heated case is first examined. In this case, the differential equation describing the flexural motion of a bar with no heating is given as:

$$\frac{d^4 z}{dx^4} - \left(\frac{\omega^2 m}{EI}\right) y = 0 \quad (2)$$

where ω represents the natural frequency values satisfying the solution of equation (2) for certain boundary conditions. E is the modulus of elasticity of the bar material, 1 is the mass moment of inertia, and m is the mass per unit length of the bar. The general solution of equation (2) is given by:

$$z = A\cosh\left[\left(\frac{m\omega^2}{EI}\right)^{\frac{1}{4}} x\right] + B\sinh\left[\left(\frac{m\omega^2}{EI}\right)^{\frac{1}{4}} x\right] + C\cos\left[\left(\frac{m\omega^2}{EI}\right)^{\frac{1}{4}} x\right] + D\sin\left[\left(\frac{m\omega^2}{EI}\right)^{\frac{1}{4}} x\right] \quad (3)$$

where A, B, C and D are the integration constants and can be found after substitution of the following boundary conditions into equation (3): at the clamped end of the uniform bar (i.e., x=0), setting $$y|_{x=0} = 0 \text{ and } \left.\frac{dy(x)}{dx}\right|_{x=0} = 0,$$

and setting $$\left.\frac{d^2 y(x)}{dx^2}\right|_{x=l} = 0 \text{ and } \left.\frac{d^3 y(x)}{dx^3}\right|_{x=l} = 0$$

at a free end of the heated bar, which reduces equation (3) to:

$$\cosh\left[\left(\frac{m\omega^2}{EI}\right)^{\frac{1}{4}} l\right]\cos\left[\left(\frac{m\omega^2}{EI}\right)^{\frac{1}{4}} l\right] + 1 = 0 \quad (4)$$

with the resulting fundamental natural frequency corresponding to the first mode of motion for the uniform bar 12 being given by:

$$\omega_{fundamental} = 1.875^2 \sqrt{\frac{EI}{ml^4}}.\qquad(5)$$

Figure 2:
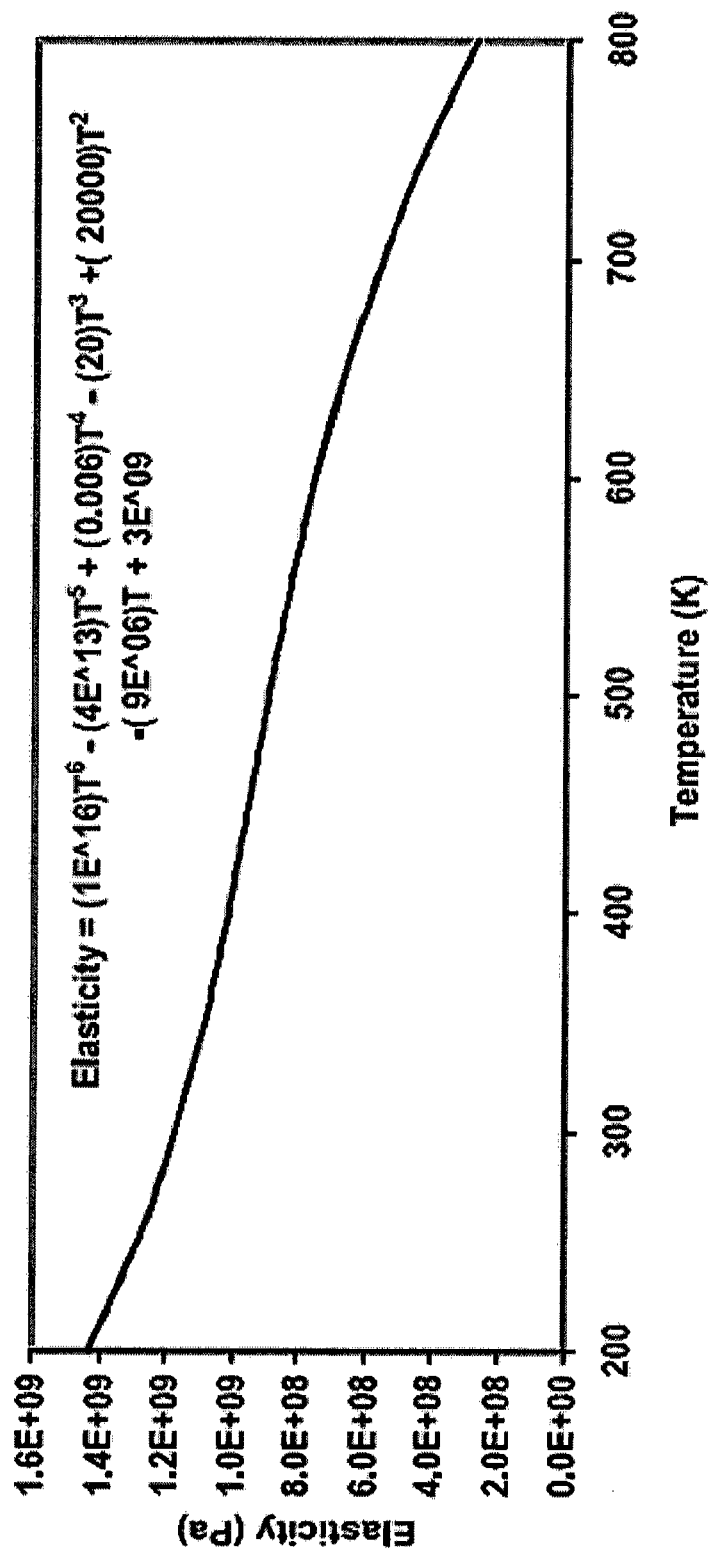
FIG. 2 is a graph illustrating elastic modulus of the heated bar as a function of temperature.
Figure 3B:
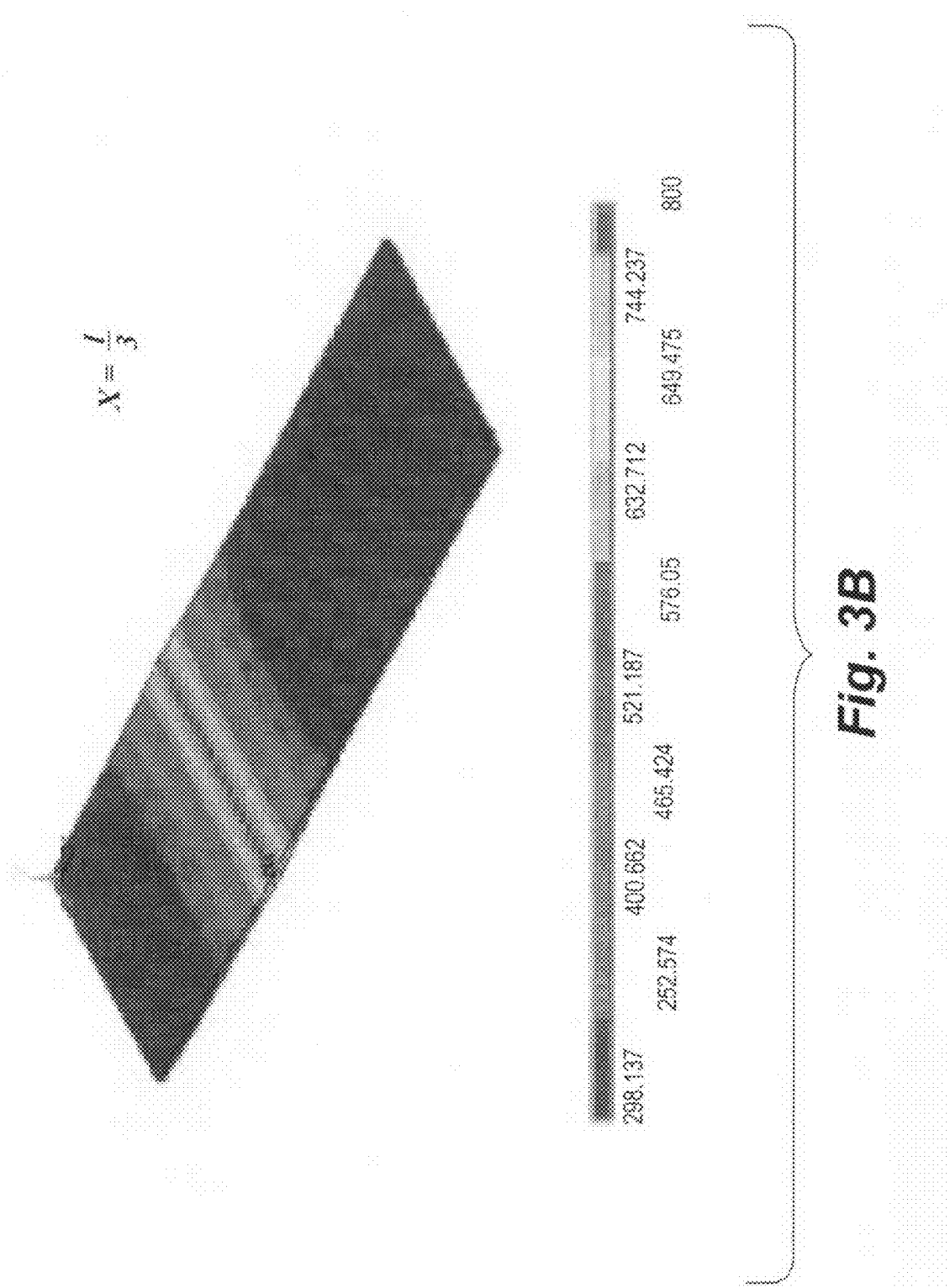
Figure 3C:
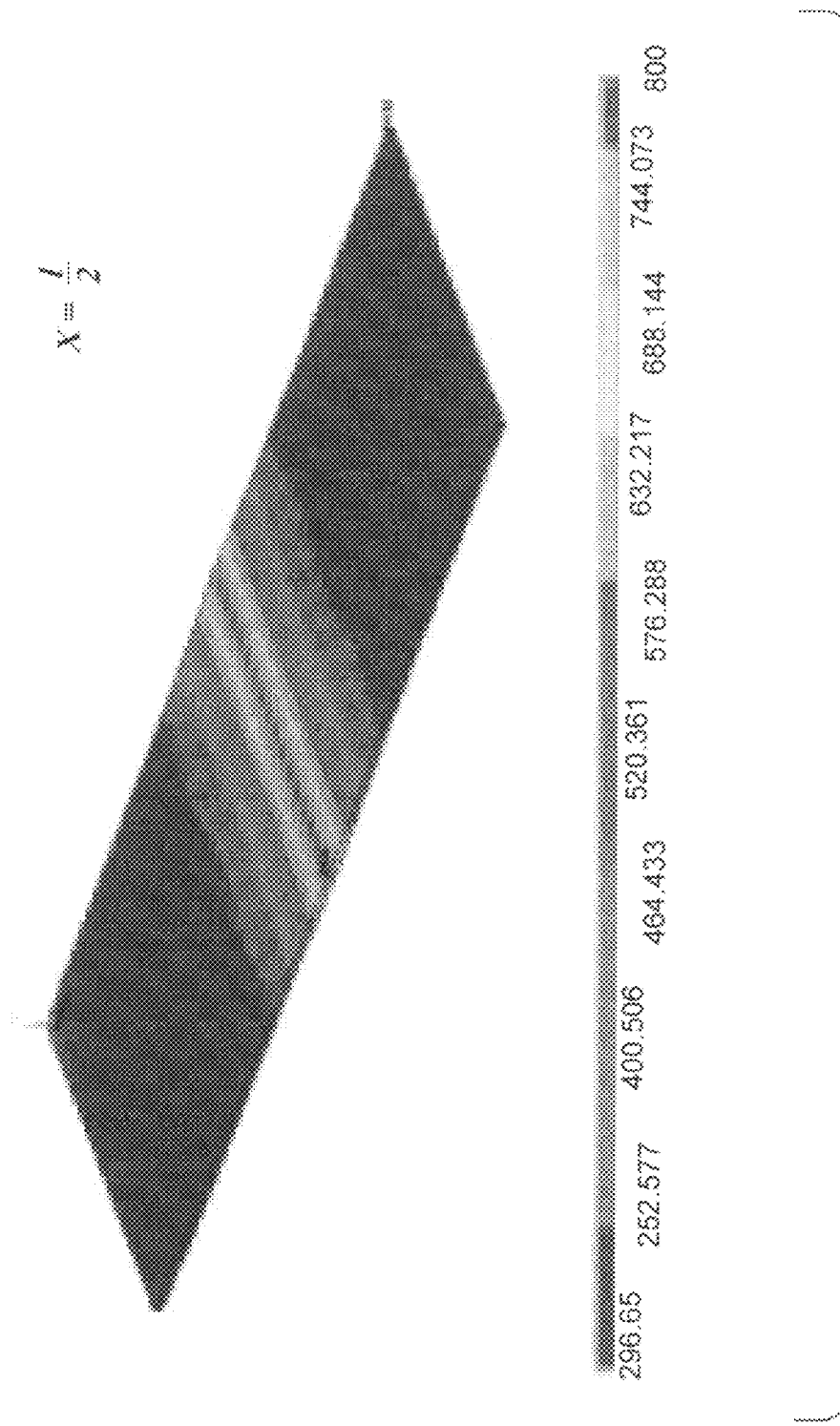
Figure 3D:
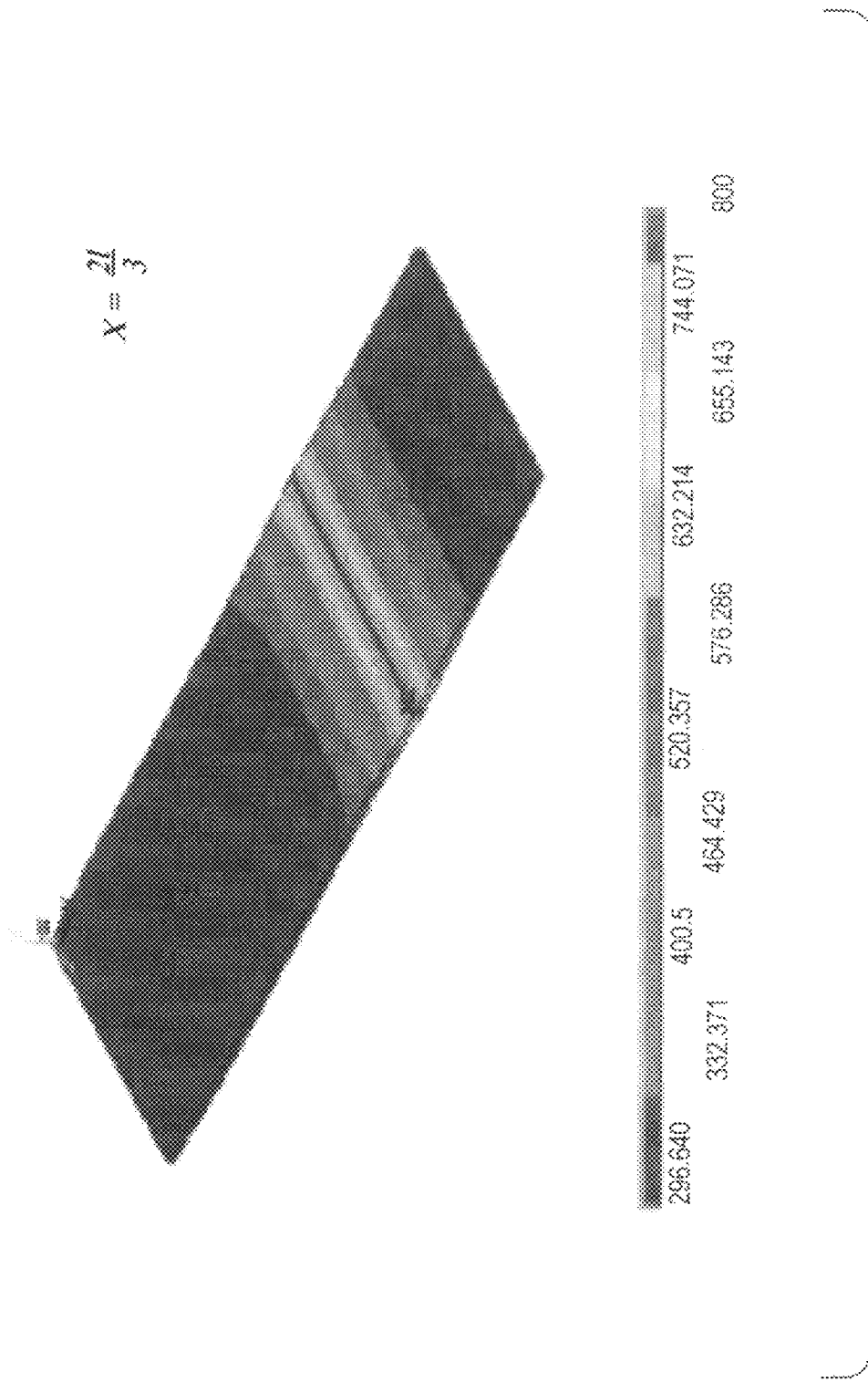

FIG. 2 illustrates the elastic modulus E as a function of temperature T. The impulsive force F exciting the free end of the bar 12 is described in Table 2 below:

TABLE 2

| Location of heat source | Heating time at which impulsive load is applied (s) | Amplitude of impulsive load, F (N) | Duration of impulsive load (s) |
|---|---|---|---|
| 0 | 2.5 | 1 | 0.001 |
| l/3 | 2.5 | 1 | 0.001 |
| l/2 | 2.5 | 1 | 0.001 |
| 2l/3 | 2.5 | 1 | 0.001 |

Grid size independency heat transfer and flexural studies were carried out to determine the optimum grid size of the bar 12. It was found that 572 elements were required to accurately simulate the flexural behavior of the bar. However, for the purpose of producing a better presentation for the temperature contours of the bar when subjected to welding at different locations, a higher number of elements were used in the following analysis. The numbers of elements used for finding the results when the bar is heated at x=0, x=0.25 l, x=0.5 l, and x=0.75 l were, respectively, 572, 1002, 994, and 983 elements.

Integration time step independency tests were further performed and the value of 0.0006 s was used in the following for performing the time integrations. The Newmark ANSYS time integration method for implicit transient analysis was employed. The dimensions for the uniform bar 12 in the following analysis (and matching the material values given above in Table 1) are as follows: 0.15 m for length l, 0.05 m for width w, and 0.0015 m for thickness h. The fundamental natural frequency was calculated according to equation (5) and found to be equal to 26.436 rad/s. The damped natural frequency is found via:

$$\omega_d = \omega_{fundamental}\sqrt{1-\xi^2}\qquad(6)$$

where $\xi$ is the damping coefficient of the uniform bar 12 (i.e., 0.015 in this example). The resulting damped natural frequency is 26.433 rad/s.

For the sake of validating the numerical results, the damped natural frequency was calculated for the case when the bar was simulated under no-heat conditions (i.e., when the temperature is 300 K and the corresponding elasticity is equal to 1.2 GPa). The resulting damped time period was found to be 0.238 s and the corresponding damped natural frequency was found to be 26.363 rad/s. The percentage difference between the results of the analytical solution and the numerical damped natural frequencies, obtained from the numerical analysis, for the uniform bar is found to be 0.07%.

In the present modeling method, a heat source resembling that found immediately after the welding process is applied at a particular x-axis location and along the y-axis of the plate is simulated. The location subjected to welding is treated as one of the boundary conditions by fixing the temperature of the welding location to the metal melting temperature $T_m$ at all the nodes of the welding location. In the numeric analysis, this can be performed by defining a thermal load function at all of the time points of the desired solution, and the value of the thermal load function will always be equal to the melting temperature of the metal.

Figure 4:
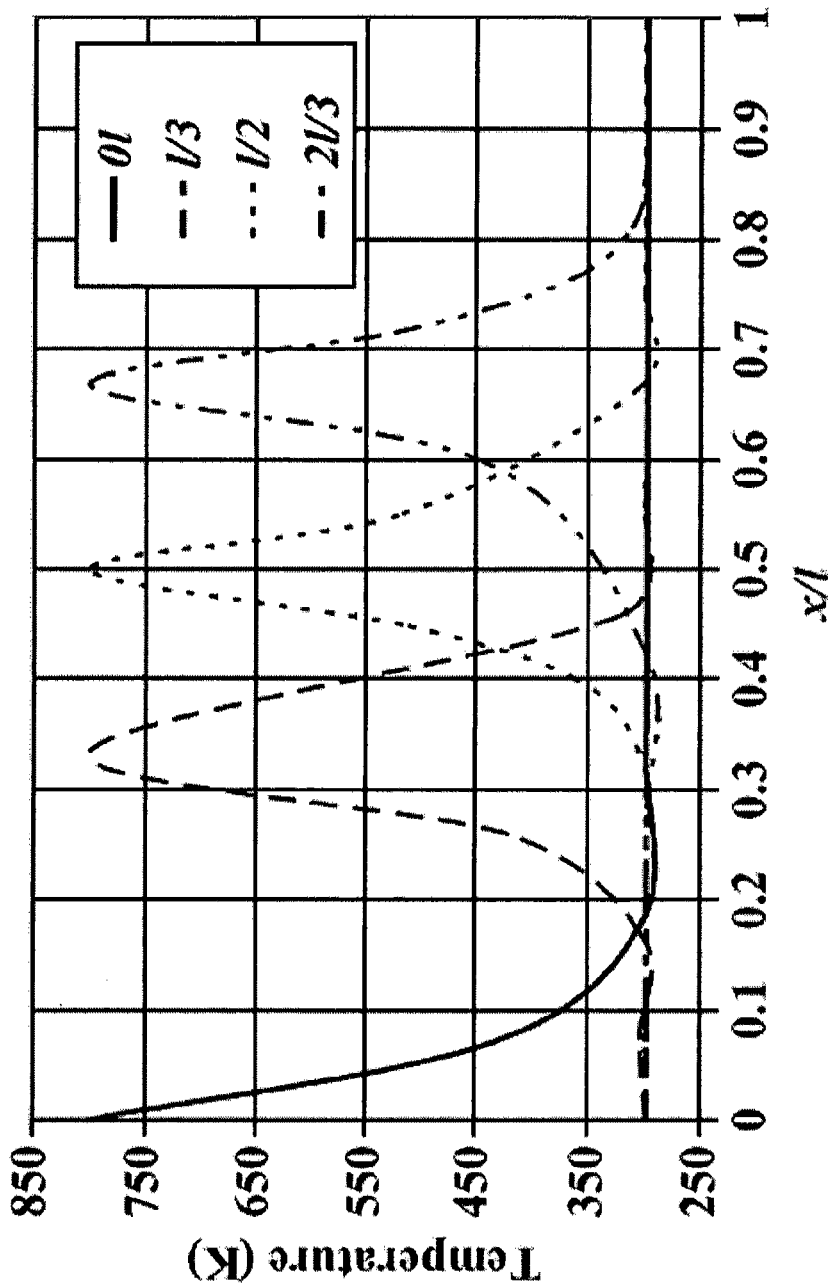
FIG. 4 is a graph illustrating spatial variations of temperature in the heated bar at varying heating locations.

The transient effects across the plate resulting from the welding process in the y and z directions are incorporated into the solution of the heat conduction equation (i.e., equation (1)). FIGS. 3A, 3B, 3C and 3D show temperature distribution at different locations in the plate (at x=0, l/3, l/2 and 2l/3, respectively), and FIG. 4 illustrates the temperature variation along the dimensionless axial length (x/l) at different locations in the plate. In FIG. 4, the spatial variations in temperature are taken at mid-plate (i.e., at y=0.5 w and z=0.5 h). Since the temperature heat source is considered, temperature attains high values at the locations of the heat source and decays sharply as the distance from the vicinity of the heat source increases in the axial direction (i.e., along the x-axis).

Figure 5:
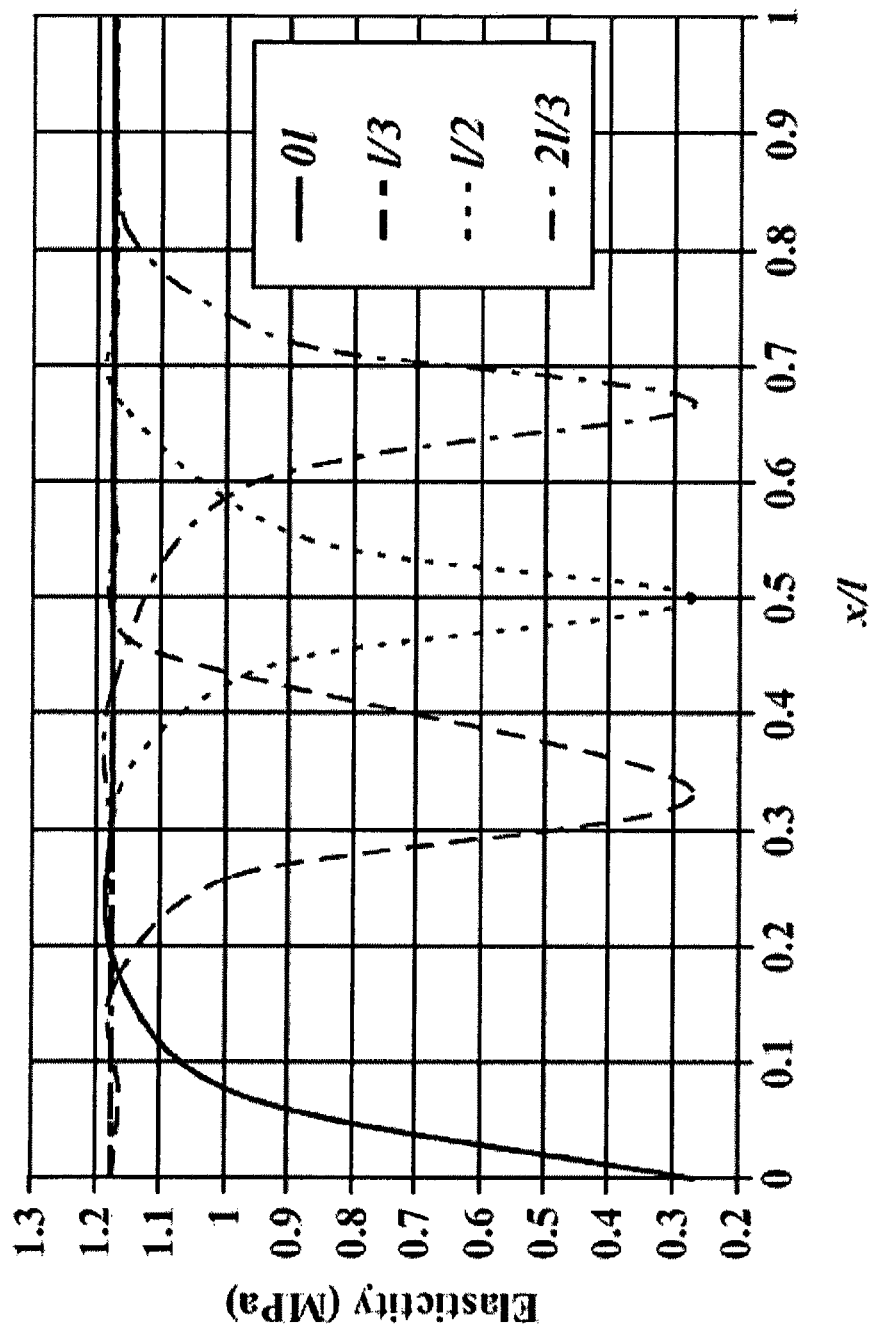
FIG. 5 is a graph illustrating spatial variations of elasticity in the heated bar at varying heating locations.
Figure 6A:
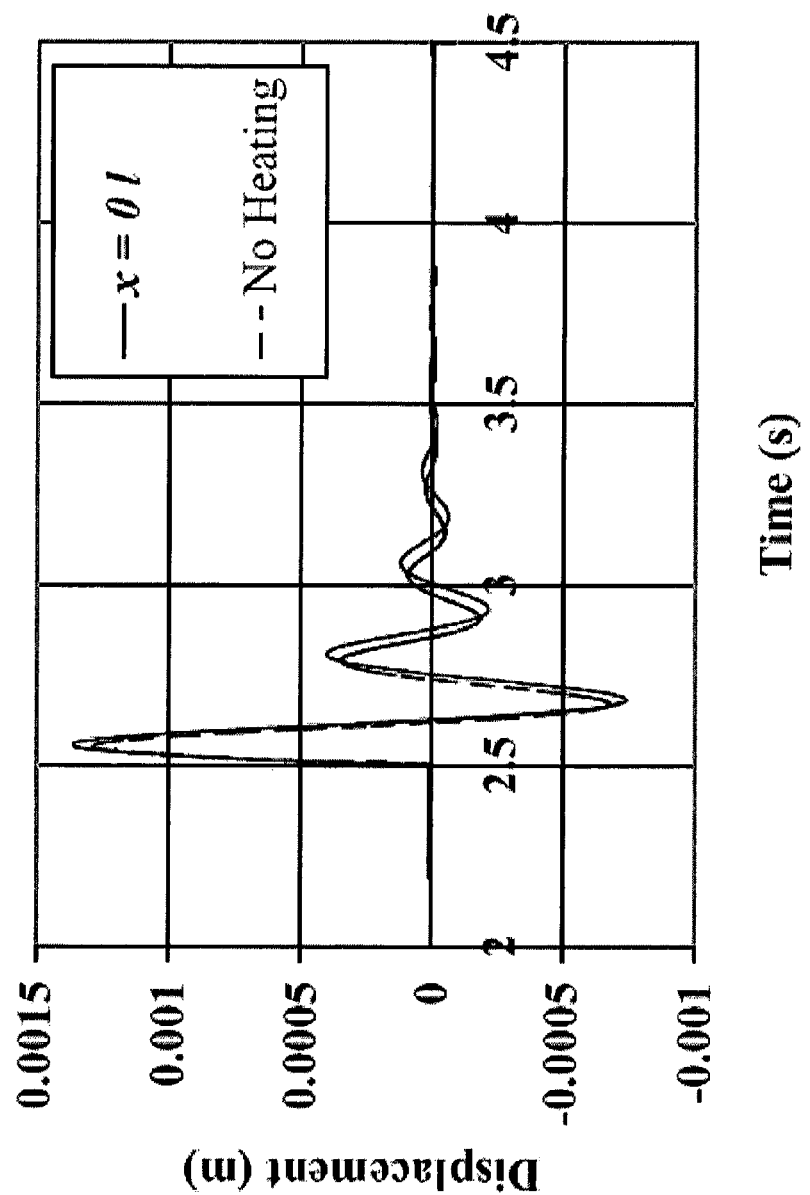
FIGS. 6A, 6B, 6C and 6D are graphs illustrating the displacement of a free end of the heated bar for differing heating periods at differing axial locations.
Figure 6B:
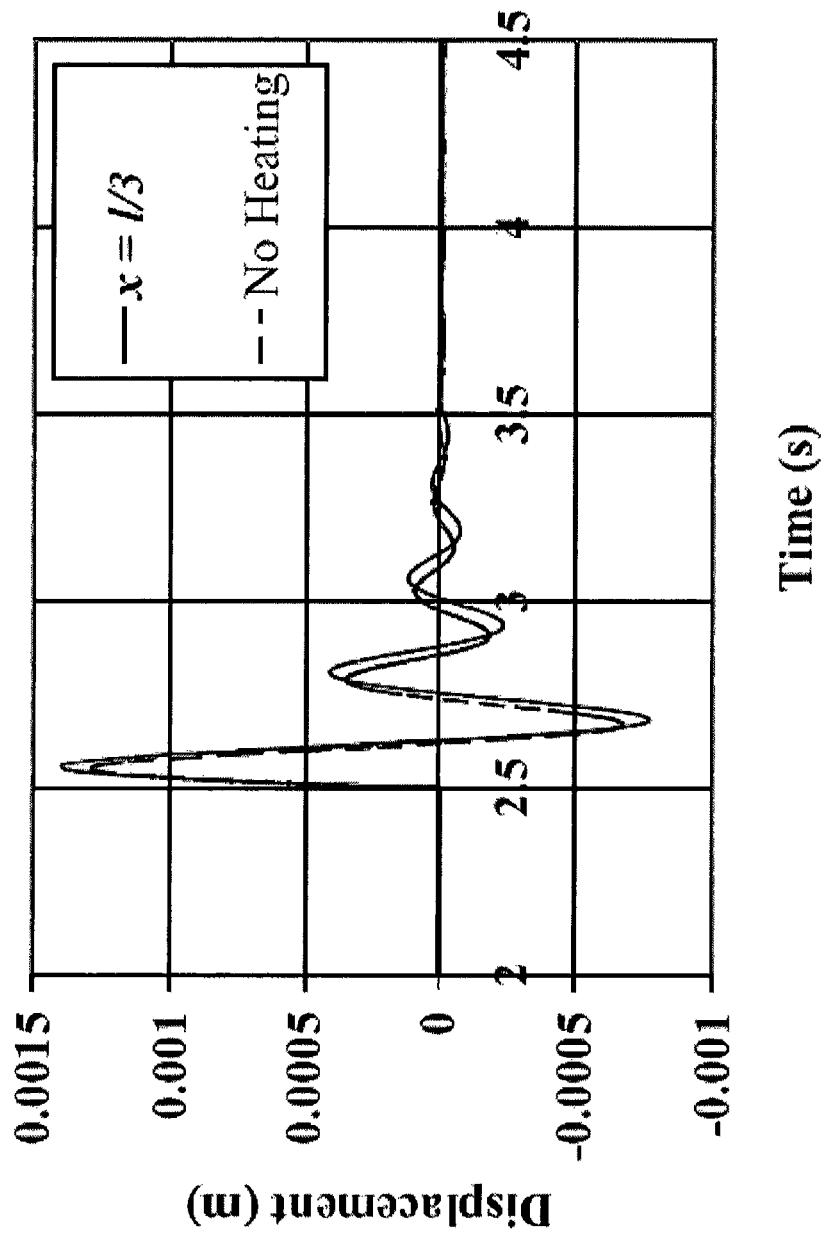
Figure 6C:
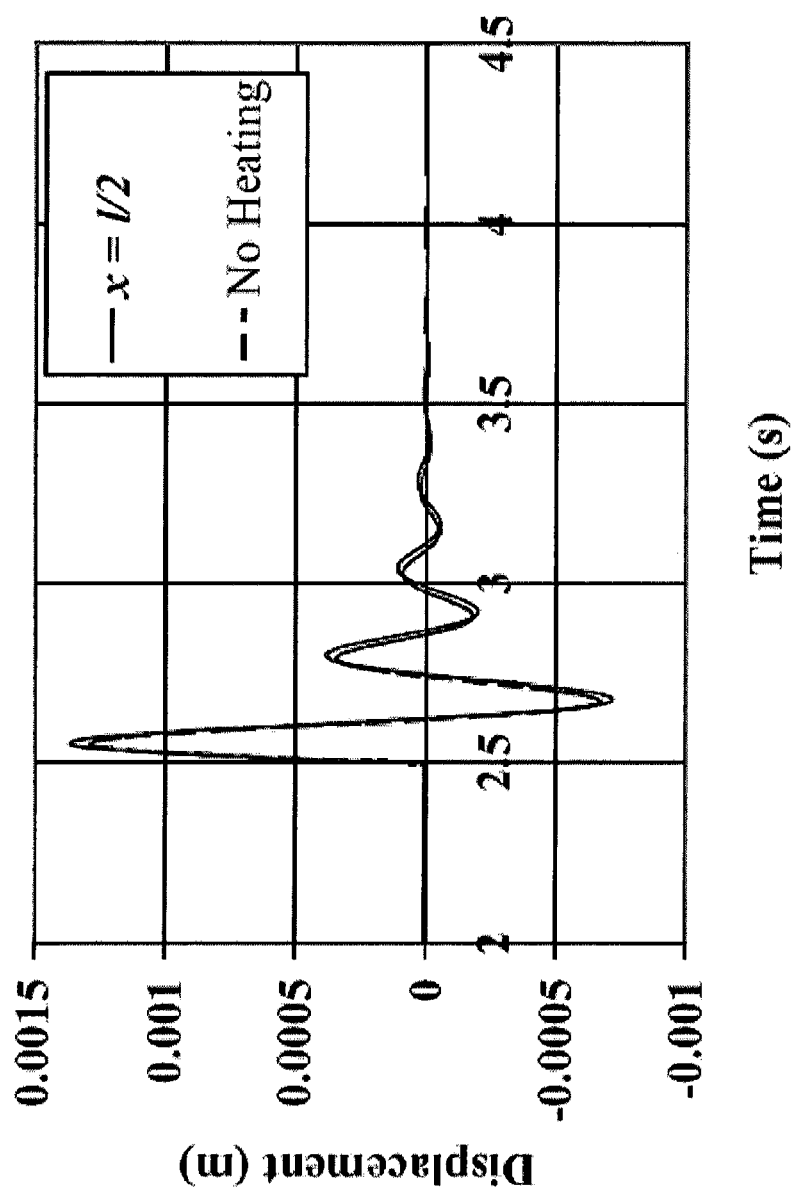
Figure 6D:
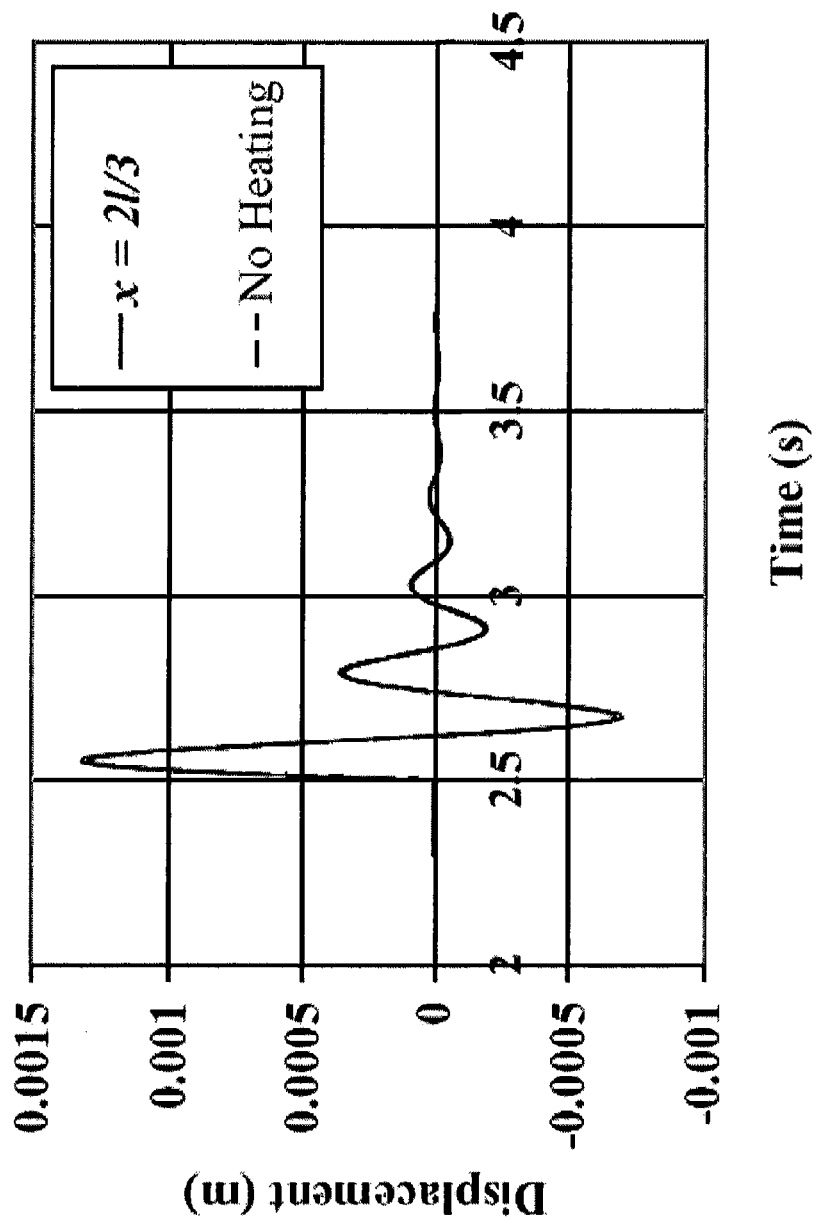

Although the convection boundary is considered at the top and bottom surfaces of the substrate bar, heat transfer through diffusion in the plate is shown to be dominant. This is due to the magnitude of the heat transfer coefficient at the surface, which is relatively low (on the order of 10 W/m² K) due to natural convection. Since the heat source is considered to be at constant temperature, the temperature gradient becomes the same in the region in front of and behind the heat source. This results in a similar elastic modulus variation around the heat source, as shown in FIG. 5, in which the elastic modulus of the substrate material is shown in the axial direction (i.e., along the x-axis). It should be noted that the elastic modulus is considered to be temperature dependent. Moreover, the location of the heat source is changed along the axial distance for each case simulated. Consequently, for each case, elastic distribution varies similarly along the x-axis, provided that the location of the maximum elastic modulus changes along the x-axis for each case.

FIG. 6 illustrates tip displacement of the bar 12 (at x=l) due to the flexural motion resulting from the applied force F (at x=0, l/3, l/2 and 2l/3, respectively). It should be noted that for each case, where the location of the heat source is changed along the axial distance, both heated and non-heated situations are considered. The resulting displacements for non-heating and heating are plotted in each Figure. As the cantilever arrangement of the bar 12 (as shown in FIG. 1) is considered and the load force F is applied at the free end of the bar 12, the flexural displacement is a maximum at the free end of the bar 12. The small difference in the displacement is observed in both the heated and non-heated cases. This difference diminishes where location of the heat source is moved to x=2l/3. Additionally, a small shift in the frequency of the flexural displacement is observed. This also diminishes for the heat source location at x=2l/3, which indicates that the location of the heat source in the bar modifies the flexural wave characteristics of the bar owing to change of elastic modulus with temperature.

Figure 7:
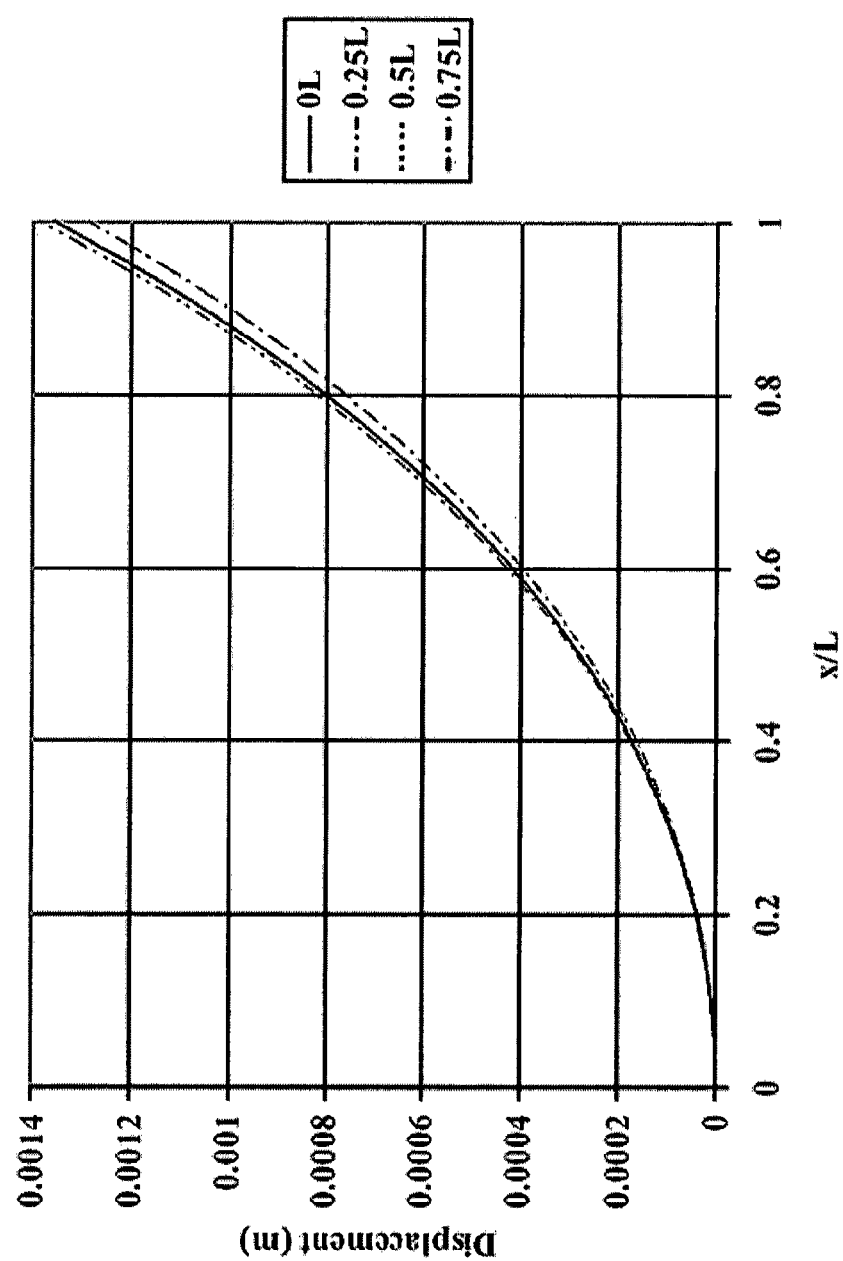
FIG. 7 is a graph illustrating the first mode shape of the heated bar along the axial direction for differing heating conditions.
Figure 8:
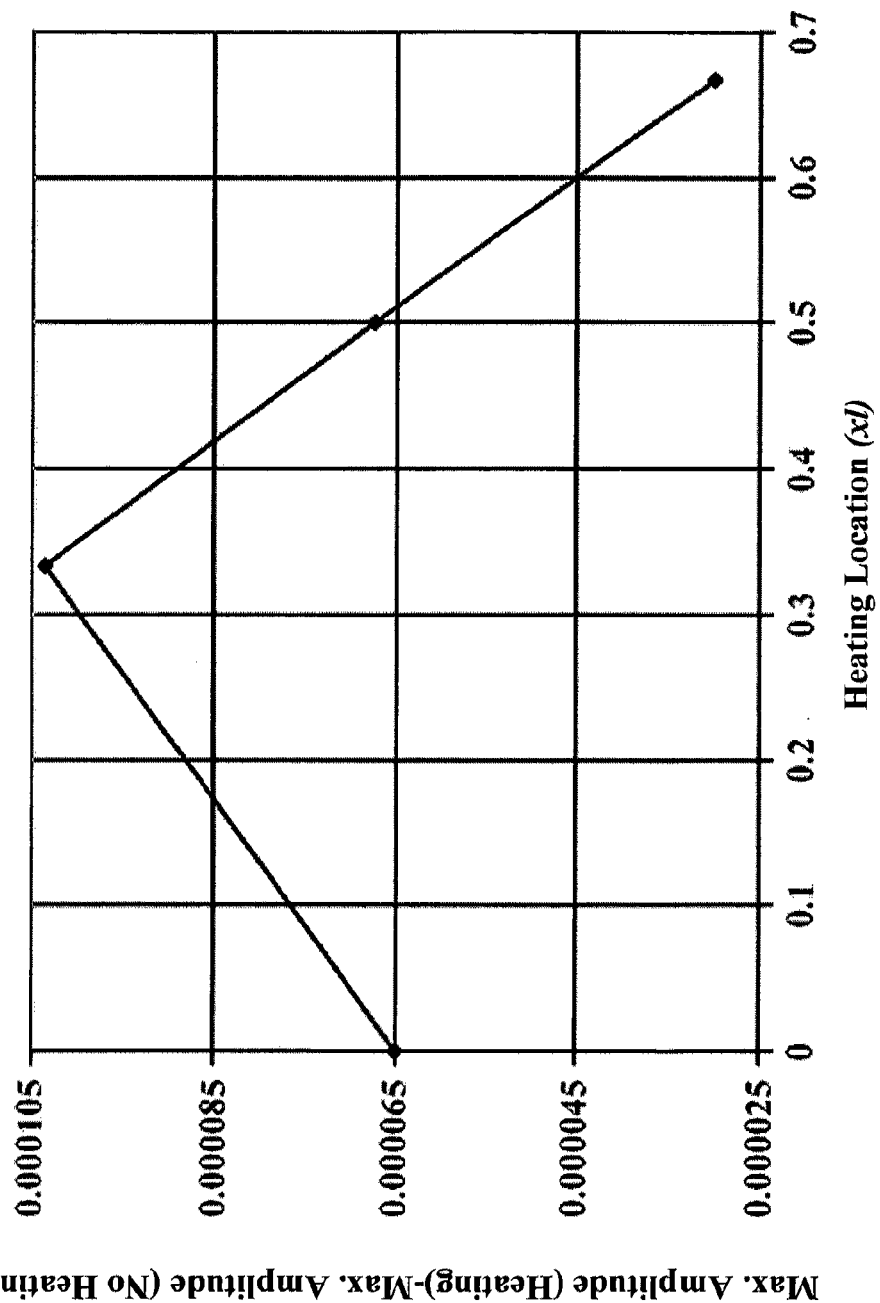
FIG. 8 is a graph illustrating the flexural amplitude of the heated bar at differing heating locations for differing heating conditions.

FIG. 7 shows the displacement along the x-axis for the first mode shape, due to natural frequency, at different heat source locations along the bar. Since the bar arrangement is cantilevered, the maximum deflection occurs at the free end of the bar. The influence of heat source location on the bar deflection is clearly shown, with the degree of deflection changing as the heat source location along the x-axis of the bar changes. Further, FIG. 8 shows the maximum amplitude difference in the flexural motion of the bar 12 when subjected to both heated and non-heated conditions. The maximum amplitude difference changes with location of the heat source and reaches the maximum value for the heat source location of x=l/3.

The variation in the maximum amplitude difference is associated with the change of elastic modulus with temperature. In this case, the heat transfer via diffusion results in extension of the high-temperature region around the heat source modifying the elastic modulus. Additionally, the small difference in the maximum amplitude in the region close to the bar's free end is due to the maximum deflections in this region, which make the amplitude difference a minimum. The variation in the maximum amplitude difference with the locations of the heat source enables analysis of the exact locations of the heat-affected region in the plate. Consequently, identification of the heat source location in the plate is possible through obtaining the amplitude difference during the flexural motion of the bar.

Figure 9:
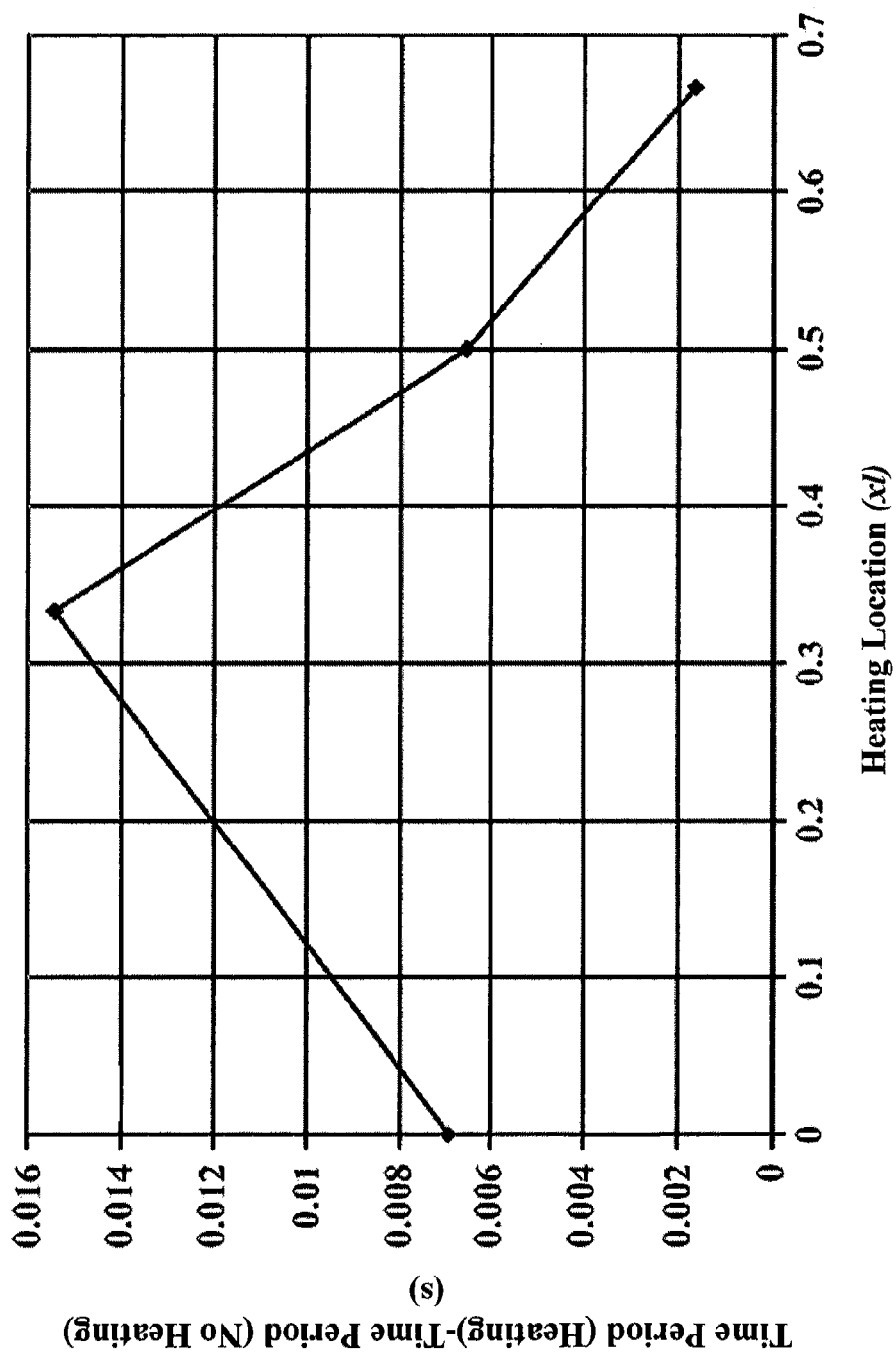
FIG. 9 is a graph illustrating the flexural period of the heated bar at differing heating locations for differing heating conditions.

FIG. 9 illustrates the time period difference of the flexural motion of the bar 12 with both heating and with no heating. It should be noted that the time period difference corresponds to the time shift of the flexural wave due to the heated and non-heated conditions. The variation of time period with the heating location is similar to that of the maximum amplitude difference (shown in FIG. 8). The time period difference reaches its maximum for a heat source location of x=l/3. However, the time period difference reduces as the location of the heat source moves toward the free end of the bar 12. The variation of the time period difference with the location of the heat source indicates that the heat source location can be obtained through correlation with the time period difference of the flexural wave.

In the above, the flexural characteristics of the cantilever uniform bar 12, heated locally, were considered, and the effect of the heat source location on the flexural motion and time response of the bar to the exciting force F was examined. In this case, the maximum amplitude difference between the heated and non-heated situations of the bar was predicted via numeric analysis, as well as the time shift of the maximum amplitude due to heating and non-heating. It was found that the maximum amplitude difference changes for the different locations of the heat source. This is attributed to the changes of the elastic modulus of the bar material with temperature, where elastic modulus reduces with increasing temperature. Since this variation is non-linear, the amplitude difference variation with heat source locations is not in a simple form. A similar argument can be applied for the time period difference due to both heating and non-heating conditions. However, the amplitude and time period difference can be related with the locations of the heat source. This relation can form the basis to determine the locations of the local heat source through analyzing the flexural motion characteristics.

In the above, the calculations may be performed by any suitable computer system, such as that diagrammatically shown in FIG. 10. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

It is to be understood that the present invention is not limited to the embodiments described above, but encompasses any and all embodiments within the scope of the following claims.

We claim:

1. A computer software product that includes a non-transitory storage medium readable by a processor, the non-transitory storage medium having stored thereon a set of instructions for modeling flexural characteristics of a bar subjected to local heating, the instructions comprising:

(a) a first set of instructions which, when loaded into main memory and executed by the processor, causes the processor to establish a set of variables x, y, z, t, T, $\rho$, $c_p$, and k, wherein the variables x, y and z represent Cartesian coordinates of a heated bar, the heated bar being elongated along the x-axis, T represents temperature, $\rho$ represents a density of the heated bar, t represents time, $c_p$ represents a specific heat capacity of the heated bar, and k represents a thermal conductivity of the heated bar;

(b) a second set of instructions which, when loaded into main memory and executed by the processor, causes the processor to calculate transient thermal diffusion through the heated bar as $$\rho c_p \frac{\partial T}{\partial t} = k\left(\frac{\partial^2 T}{\partial x^2} + \frac{\partial^2 T}{\partial y^2} + \frac{\partial^2 T}{\partial z^2}\right);$$

(c) a third set of instructions which, when loaded into main memory and executed by the processor, causes the processor to establish boundary conditions for the calculation of transient thermal diffusion through the heated bar, including setting the temperature T at a selected cross-sectional slice of the heated bar having a constant x value to a melting temperature of the heated bar $T_m$;

(d) a fourth set of instructions which, when loaded into main memory and executed by the processor, causes the processor to calculate a fundamental frequency of vibration of the heated bar using a non-heated model such that $$z = A\cosh\left[\left(\frac{m\omega^2}{EI}\right)^{\frac{1}{4}} x\right] + B\sinh\left[\left(\frac{m\omega^2}{EI}\right)^{\frac{1}{4}} x\right] + C\cos\left[\left(\frac{m\omega^2}{EI}\right)^{1/4} x\right] + D\sin\left[\left(\frac{m\omega^2}{EI}\right)^{\frac{1}{4}} x\right],$$

wherein A, B, C and D are integration constants, m represents a mass of the heated bar, E represents an elastic modulus of the heated bar, I represents a moment of inertia of the bar, and $\omega$ represents the fundamental frequency of vibration;

(e) a fifth set of instructions which, when loaded into main memory and executed by the processor, causes the processor to establish vibrational boundary conditions for the calculation of the fundamental frequency of vibration;

(f) a sixth set of instructions which, when loaded into main memory and executed by the processor, causes the processor to calculate a damped natural frequency of vibration of the heated bar as $\omega_d = \omega\sqrt{1-\xi^2}$, wherein $\xi$ represents a damping constant of the heated bar;

(g) a seventh set of instructions which, when loaded into main memory and executed by the processor, causes the processor to calculate a temperature-dependent frequency and a temperature-dependent amplitude of vibration for the heated bar based upon the damped natural frequency of vibration; and (h) an eighth set of instructions which, when loaded into main memory and executed by the processor, causes the processor to display numerical results of the calculated temperature-dependent frequency and temperature-dependent amplitude of vibration for the heated bar.

2. The computer software product as recited in claim 1, wherein the fifth set of instructions includes setting $$y|_{x=0} = 0 \text{ and } \frac{dy(x)}{dx}\bigg|_{x=0} = 0$$

at a fixed end of the heated bar, and setting $$\frac{d^2 y(x)}{dx^2}\bigg|_{x=l} = 0 \text{ and } \frac{d^3 y(x)}{dx^3}\bigg| = 0$$

for x=l at a free end of the heated bar.

3. The computer software product as recited in claim 2, wherein the second set of instructions includes a finite element method calculation.

* * * * *